(12) United States Patent
Austrheim

(10) Patent No.: US 11,873,014 B2
(45) Date of Patent: Jan. 16, 2024

(54) DELIVERY SYSTEM WITH AN ACCESS POINT AND A METHOD OF ACCESSING AN ACCESS POINT OF THE DELIVERY SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 523 days.

(21) Appl. No.: 15/734,855

(22) PCT Filed: Jun. 11, 2019

(86) PCT No.: PCT/EP2019/065189
§ 371 (c)(1),
(2) Date: Dec. 3, 2020

(87) PCT Pub. No.: WO2019/238664
PCT Pub. Date: Dec. 19, 2019

(65) Prior Publication Data
US 2021/0229909 A1    Jul. 29, 2021

(30) Foreign Application Priority Data

Jun. 12, 2018 (NO) .................................. 20180813
Jul. 19, 2018 (NO) .................................. 20181005
Dec. 10, 2018 (NO) .................................. 20181581

(51) Int. Cl.
*B65G 1/137* (2006.01)
*B61B 13/00* (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .. B65G 1/0492; B65G 1/0457; B65G 1/1378; B65G 2201/0235; G05D 2201/0216
See application file for complete search history.

(56) References Cited

U.S. PATENT DOCUMENTS 3,519,150 A    7/1970 Keena et al.
3,800,963 A    4/1974 Holland
(Continued)

FOREIGN PATENT DOCUMENTS

CA    2988122 A1    12/2016
CN   101553416 A    10/2009
(Continued)

OTHER PUBLICATIONS

Office Action in counterpart Chinese Patent Application No. 201980039028.7 dated Oct. 27, 2021 (15 pages).
(Continued)

*Primary Examiner* — Kyle O Logan
(74) *Attorney, Agent, or Firm* — Osha Bergman Watanabe & Burton LLP

(57) ABSTRACT

An automated storage and retrieval system includes a storage grid for storage of storage containers and a delivery system for transport of said storage containers between a delivery port of the storage grid and an access point of the delivery system. The access point is adapted for handling of items held in the storage containers by a robotic operator or human operator. The delivery system includes a delivery rail system including at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of
(Continued)

delivery grid cells, the access point, and a remotely operated delivery vehicle comprising a motorized vehicle body and a container carrier provided above the motorized vehicle body for carrying a storage container of the storage containers. The delivery vehicle is moveable on the delivery grid of the delivery rail system. The delivery grid provides one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle via the plurality of delivery grid cells. The remotely operated delivery vehicle is arranged to transport the storage container from the delivery port of the storage grid across the delivery grid to the access point and return the storage container to the delivery port for storage within the storage grid. The access point is provided in a container accessing station, said station being arranged for separating the robotic or human operator from the delivery rail system and the remotely operated delivery vehicle. The container accessing station comprises a cabinet comprising walls and a top cover supported thereon, wherein the items held in the storage container carried by a remotely operated delivery vehicle at the access point is reachable through an opening in the top cover.

8 Claims, 11 Drawing Sheets

(51) Int. Cl.
| | | |
|---|---|---|
| *B65G 1/04* | (2006.01) | |
| *B65G 1/06* | (2006.01) | |
| *B65G 47/06* | (2006.01) | |
| *B65G 47/52* | (2006.01) | |
| *B65G 57/03* | (2006.01) | |
| *B65G 63/06* | (2006.01) | |
| *B65G 65/23* | (2006.01) | |
| *B65G 67/24* | (2006.01) | |
| *B66F 9/06* | (2006.01) | |
| *B66F 9/19* | (2006.01) | |
| *G05D 1/00* | (2006.01) | |
| *G05D 1/02* | (2020.01) | |
| *B60W 50/00* | (2006.01) | |
| *B65G 43/00* | (2006.01) | |
| *B65G 63/00* | (2006.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(56) References Cited

U.S. PATENT DOCUMENTS

| | | |
|---|---|---|
| 4,538,950 A | 9/1985 | Shiomi et al. |
| 4,909,697 A | 3/1990 | Bernard, II et al. |
| 5,538,809 A | 7/1996 | Bittihn et al. |
| 7,101,139 B1 | 9/2006 | Benedict |
| 8,628,289 B1 | 1/2014 | Benedict et al. |
| 9,527,669 B1 | 12/2016 | Hanssen et al. |
| 9,714,139 B1 | 7/2017 | Aggarwal |
| 2003/0093176 A1 | 5/2003 | Ohtsuka et al. |
| 2005/0047895 A1 | 3/2005 | Lert |
| 2005/0118003 A1 | 6/2005 | Mitchell et al. |
| 2009/0136328 A1* | 5/2009 | Schafer ............... B65G 1/026 414/807 |
| 2011/0027059 A1 | 2/2011 | Benedict et al. |
| 2011/0203231 A1* | 8/2011 | Hortig ................ B65B 67/02 53/235 |
| 2012/0101627 A1* | 4/2012 | Lert ..................... B65G 1/1373 700/216 |
| 2012/0282068 A1 | 11/2012 | Tschurwald et al. |
| 2013/0302132 A1 | 11/2013 | D'Andrea |
| 2014/0014470 A1 | 1/2014 | Razumov |
| 2014/0086714 A1 | 3/2014 | Malik |
| 2014/0277693 A1 | 9/2014 | Naylor |
| 2014/0288696 A1 | 9/2014 | Lert |
| 2014/0292274 A1 | 10/2014 | Dorval et al. |
| 2014/0311858 A1 | 10/2014 | Keating et al. |
| 2015/0086304 A1* | 3/2015 | Hasman ............... B65G 1/1378 414/269 |
| 2015/0127143 A1* | 5/2015 | Lindbo ................. G05B 15/02 700/218 |
| 2016/0009493 A1* | 1/2016 | Stevens ............... B65G 1/1373 700/216 |
| 2016/0060037 A1 | 3/2016 | Razumov |
| 2016/0129587 A1* | 5/2016 | Lindbo ................. B25J 9/0096 700/218 |
| 2016/0130085 A1* | 5/2016 | Yamashita .......... B65G 1/1373 414/807 |
| 2016/0145058 A1* | 5/2016 | Lindbo ................ B65G 1/0464 700/218 |
| 2016/0176638 A1 | 6/2016 | Toebes |
| 2016/0194151 A1 | 7/2016 | Lindbo et al. |
| 2016/0325932 A1* | 11/2016 | Hognaland .......... B65G 1/0478 |
| 2016/0355337 A1* | 12/2016 | Lert ..................... B65G 1/1378 |
| 2017/0050809 A1 | 2/2017 | Itoh et al. |
| 2017/0057745 A1 | 3/2017 | Ueda et al. |
| 2017/0166400 A1 | 6/2017 | Hofmann |
| 2017/0313514 A1* | 11/2017 | Lert, Jr. .............. B65G 1/0478 |
| 2017/0362039 A1* | 12/2017 | Eisenberg ............ B65G 47/46 |
| 2018/0029798 A1* | 2/2018 | Lindbo ................ B65G 1/137 |
| 2018/0043528 A1* | 2/2018 | Lindbo ................ B65G 1/065 |
| 2018/0044110 A1 | 2/2018 | Clarke et al. |
| 2018/0065804 A1* | 3/2018 | Hognaland .......... B65G 1/0464 |
| 2018/0068253 A1 | 3/2018 | Simms et al. |
| 2018/0075402 A1* | 3/2018 | Stadie ................. G05D 1/0297 |
| 2018/0082162 A1 | 3/2018 | Durham et al. |
| 2018/0118078 A1 | 5/2018 | Alkhaldi et al. |
| 2018/0141754 A1 | 5/2018 | Garrett et al. |
| 2018/0150793 A1 | 5/2018 | Lert, Jr. et al. |
| 2018/0162639 A1* | 6/2018 | Ingram-Tedd ....... B65G 1/0464 |
| 2018/0178979 A1* | 6/2018 | Bretz .................. B65G 1/0407 |
| 2018/0194571 A1* | 7/2018 | Fryer .................. B25J 11/0085 |
| 2018/0237221 A1* | 8/2018 | Lindbo ................ E04B 2/7403 |
| 2018/0244467 A1* | 8/2018 | Hognaland .......... B65G 1/0464 |
| 2018/0305123 A1* | 10/2018 | Lert, Jr. .............. G06V 40/20 |
| 2018/0346243 A1* | 12/2018 | Lindbo ................ B65G 1/1373 |
| 2018/0370726 A1 | 12/2018 | Grosse et al. |
| 2019/0031399 A1* | 1/2019 | Shaikh ................ B65D 25/14 |
| 2019/0054932 A1* | 2/2019 | Stadie ................. B08B 3/02 |
| 2019/0375588 A1* | 12/2019 | Lindbo ................ B65G 1/0492 |

(56) References Cited

U.S. PATENT DOCUMENTS

| | | | | |
|---|---|---|---|---|
| 2020/0031575 A1* | 1/2020 | Hognaland | .......... | B65G 1/1373 |
| 2020/0148474 A1 | 5/2020 | Salichs et al. | | |

FOREIGN PATENT DOCUMENTS

| | | | |
|---|---|---|---|
| CN | 101711210 A | 5/2010 | |
| CN | 102050333 A | 5/2011 | |
| CN | 102992012 A | 3/2013 | |
| CN | 104066661 A | 9/2014 | |
| CN | 104781163 A | 7/2015 | |
| CN | 104885106 A | 9/2015 | |
| CN | 105383848 A | 3/2016 | |
| CN | 105517923 A | 4/2016 | |
| CN | 105899398 A | 8/2016 | |
| CN | 105947514 A | 9/2016 | |
| CN | 106064718 A | 11/2016 | |
| CN | 106241154 A | 12/2016 | |
| CN | 106414278 A | 2/2017 | |
| CN | 106575391 A | 4/2017 | |
| CN | 106660703 A | 5/2017 | |
| CN | 106662874 A | 5/2017 | |
| CN | 106829298 A | 6/2017 | |
| CN | 206790852 U | 12/2017 | |
| CN | 107848707 A | 3/2018 | |
| CN | 108140168 A | 6/2018 | |
| CN | 108430895 A | 8/2018 | |
| CN | 109328150 A | 2/2019 | |
| CN | 109982948 A | 7/2019 | |
| DE | 40 16 810 C1 | 11/1991 | |
| DE | 9310690 U1 | 9/1993 | |
| DE | 102009017241 A1 | 10/2010 | |
| EP | 0458021 A1 | 11/1991 | |
| EP | 2881905 A1 | 6/2015 | |
| EP | 3003932 A1 | 4/2016 | |
| EP | 3288865 A1 | 3/2018 | |
| GB | 1267751 A | 3/1972 | |
| GB | 1 276 160 A | 6/1972 | |
| GB | 233319 A | 1/1991 | |
| JP | S60-137703 A | 7/1985 | |
| JP | S6417707 A | 1/1989 | |
| JP | H06-043936 A | 2/1994 | |
| JP | H08-217209 A | 8/1996 | |
| JP | H09-152914 A | 6/1997 | |
| JP | H11-143538 A | 5/1999 | |
| JP | 2000-044010 A | 2/2000 | |
| JP | 2000-191106 A | 7/2000 | |
| JP | 2003-137406 A | 5/2003 | |
| JP | 2009184775 A | 8/2009 | |
| JP | 2011-102166 A | 5/2011 | |
| JP | 2015-535517 A | 12/2015 | |
| JP | 2017-088404 A | 5/2017 | |
| JP | 2017-524625 A | 8/2017 | |
| KR | 20170026074 A | 3/2017 | |
| NO | 317366 B1 | 10/2004 | |
| NO | 20161642 A1 | 4/2018 | |
| NO | 20170360 A1 | 9/2018 | |
| NO | 20170754 A1 | 11/2018 | |
| NO | 20171064 A1 | 12/2018 | |
| RU | 2008111257 A | 10/2009 | |
| WO | 9614258 A1 | 5/1996 | |
| WO | 2005/077789 A1 | 8/2005 | |
| WO | 2012106746 A1 | 8/2012 | |
| WO | 2014/075937 A1 | 5/2014 | |
| WO | 2014075937 A1 | 5/2014 | |
| WO | 2014/090684 A1 | 6/2014 | |
| WO | 2014/195901 A1 | 12/2014 | |
| WO | 2015084236 A1 | 6/2015 | |
| WO | 2015/140216 A1 | 9/2015 | |
| WO | 2015/170660 A1 | 11/2015 | |
| WO | 2015/193278 A1 | 12/2015 | |
| WO | 2015193278 A1 | 12/2015 | |
| WO | 2016/166294 A1 | 10/2016 | |
| WO | 2016/166323 A1 | 10/2016 | |
| WO | 2016172793 A1 | 11/2016 | |
| WO | 2016/191777 A1 | 12/2016 | |
| WO | 2016196815 A1 | 12/2016 | |
| WO | 2016198467 A1 | 12/2016 | |
| WO | 2017081273 A1 | 5/2017 | |
| WO | 2017081281 A1 | 5/2017 | |
| WO | 2017/121512 A1 | 7/2017 | |
| WO | 2017121515 A1 | 7/2017 | |
| WO | 2017/153563 A1 | 9/2017 | |
| WO | 2017/211640 A1 | 12/2017 | |
| WO | 2018/053236 A1 | 3/2018 | |
| WO | 2018/162757 A1 | 9/2018 | |
| WO | 2018/233886 A1 | 12/2018 | |
| WO | 2019/141877 A1 | 7/2019 | |

OTHER PUBLICATIONS

Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in Chinese Application No. 2020800592135 dated Feb. 1, 2023 (21 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, dated Sep. 27, 2021 (25 pages).
Office Action issued in the counterpart Chinese Patent Application No. 2019800383353, dated Dec. 17, 2021 (3 pages).
Office Action in counterpart Chinese Patent Application No. 201980038106.1 dated Sep. 8, 2021 (6 pages).
Office Action in counterpart Chinese Patent Application No. 201980039693.6 dated Oct. 18, 2021 (12 pages).
Office Action issued in the counterpart Chinese Patent Application No. 201980039066.2, dated Sep. 10, 2021 (10 pages).
Search issued in the counterpart chinese Patent Application No. 201980039066.2, dated Sep. 6, 2021 (3 pages).
United States Office Action in related U.S. Appl. No. 16/972,482, dated Mar. 22, 2022 (46 pages).
Norwegian Search Report issued in NO 20181005 dated Feb. 6, 2019 (2 pages).
Norwegian Search Report issued in NO 20181581 dated Feb. 20, 2019 (5 pages).
International Search Report issued in International Application No. PCT/EP2019/065189, dated Sep. 12, 2019 (4 pages).
Written Opinion issued in International Application No. PCT/EP2019/065189; dated Sep. 12, 2019 (8 pages).
International Preliminary Report on Patentability issued in International Application No. PCT/EP2019/065189; dated Sep. 14, 2020 (14 pages).
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action issued in counterpart Japanese Patent Application No. 2020-568712 dated Jun. 26, 2023 (7 pages).
Office Action issued in the counterpart European Patent Application No. 19730155.9, dated Sep. 4, 2023 (6 pages).

* cited by examiner

A

B

A

B

DELIVERY SYSTEM WITH AN ACCESS POINT AND A METHOD OF ACCESSING AN ACCESS POINT OF THE DELIVERY SYSTEM

The present invention relates to an automated storage and retrieval system comprising a storage grid for storage of storage containers and a delivery system for delivery of said storage containers between the storage grid and an access point of the delivery system, and a method of operating a delivery vehicle into an out of the access point.

The invention is also directed to an access point of a delivery system, wherein the access point is arranged such that there is more than one path to and/or from the access point for a remotely operated delivery vehicle carrying a storage container.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 1C, $Z=8$ identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy rid location or cell $X=10$, $Y=2$, $Z=3$. The container handling vehicles 101 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column and the access station.

If the lower port of the delivery column and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, disclose an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding delivery columns to the grid, as this will allow the container handling vehicles 200,300 to be distributed among a larger number of ports of delivery columns in order to avoid congestion. However, if ports and columns are added, the conveyor system infrastructure must normally be increased. This requires space, which may not necessarily be available. Also, adding conveyor system infrastructure is costly.

Another problem with prior art automated storage and retrieval systems 1 is that the separate drop-off ports and pick-up ports of the delivery columns 119,120 require the container handling vehicles 200,300 to move to a storage column 105 after drop-off to retrieve a new storage container 106. Likewise, the container handling vehicles 200,300 have to be empty of a storage container 106 when they are sent to a pick-up port 120 to pick up a storage container. This results in an inefficiency and causes increased congestion around the ports, as container handling vehicles 200,300 are moving around on the grid without a storage container 106 as payload. In addition, the delivery columns 119,120 may take up space on the grid 104 which could be used for other purposes such as the movement of container handling vehicles 200,300.

In view of the above, it is desirable to provide an automated storage and retrieval system, and a method for operating such a system, that solve or at least mitigate one or more of the aforementioned problem related to use of prior art storage and retrieval systems.

An objective of the invention is to provide an automated storage and retrieval system which is more effective than prior art systems by avoiding or at least reducing congestion of storage containers around the delivery column.

Another objective is to provide an automated storage and retrieval system that increases the availability of a delivery column for container handling vehicles operating on a rail system.

Another objective is to provide a high efficiency automated storage and retrieval system which are easy to install, and which delivery capacity can easily be increased after completed installation.

Yet another objective is to provide a dedicated area where storage containers and items held in the storage containers, effectively and easily can be handled and that the storage containers can be handled in right order.

SUMMARY OF THE INVENTION

The invention is set forth in the independent claims and the dependent claims describe alternatives of the invention.

In the following the term "remotely operated delivery vehicle" is referred to as the "delivery vehicle" and the term "automated storage and retrieval grid" is referred to as the "storage grid". The term "a storage container" is also known in prior art as "a bin". The term "picking and stocking station" is also referred to as an "access station" or "accessing station".

The present invention is related to an automated storage and retrieval system comprising a storage grid for storage of storage containers and a delivery system for transport of said storage containers between a delivery port of the storage grid and an access point of the delivery system, the access point being adapted for handling of items held in the storage containers by a robotic operator or human operator.

The delivery system comprises:
- a delivery rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells,
- a remotely operated delivery vehicle comprising a motorized vehicle body and a container carrier provided above the motorized vehicle body for carrying a storage container of the storage containers, and wherein the delivery vehicle is moveable on the delivery grid of the delivery rail system.

Wherein the delivery grid provides one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle via the plurality of delivery grid cells, and wherein the remotely operated delivery vehicle is arranged to transport the storage container from the delivery port of the storage grid across the delivery grid to the access point and return it to the delivery port for storage within the storage grid.

The storage grid for storage of storage containers comprises a storage grid rail system arranged in a grid pattern across the top of the storage grid, on which rail system a plurality of container handling vehicles are operated to raise storage containers from, and lower storage containers into, the storage columns, and also to transport the storage containers above the storage columns.

The storage grid has at least one grid column which is used not for storing storage containers, but which comprises a location where the container handling vehicles can drop off and/or pick up storage containers so that they can be transported to an access station of a delivery system where the storage containers can be accessed.

The drop-off and pick-up ports of the container handling vehicles are referred to as the "upper ports" of a delivery column. While the opposite end of the delivery column, the port towards the delivery system is referred to as the delivery port.

Thus, the delivery port is defined as the port (grid cell) in which the storage container enters or exits the storage grid.

The delivery rail system extends between a location vertically below the delivery port of the storage grid to the access point adapted for handling of items held in the storage containers by a robotic operator or human operator. A remotely operated delivery vehicle is arranged for transport of storage containers between the delivery port and the access point.

To get the most storage space for storage containers in the storage and retrieval grid, it may be advantageous to arrange the delivery rails system such that it extends as little as possible into the storage grid. That means that the storage and retrieval grid may comprise a plurality of storage columns extending from the upper level to the base of the storage grid, thus allowing the greatest possible storage capacity since the entire storage column may be used for storage.

In order to maintain greatest possible storage capacity, the part of the delivery rail system extending into the storage grid may be kept as small (little extent) as possible. Thus, the delivery rail system and the delivery vehicle may occupy as little space as possible of the storage and retrieval grid, the space which may be used for storage of storage containers.

Moreover, at least one, preferably each, of the plurality of delivery vehicle grid cells of the delivery rail system may be arranged directly below a container handling vehicle grid cell of the container handling vehicle rail system. The delivery rail system may extend within the framework structure of the storage grid.

The second location would thus be located inside the framework structure of the storage grid.

The delivery rail system may extend to the outside the framework structure of the storage grid, preferably to the access point. When the access point is located outside the storage grid, they do not take up storage capacity of the grid.

The delivery rail system may comprise a first rail system located within the framework structure of the storage grid, and a second rail system located outside the framework structure of the storage grid, and wherein the first and second rail system are connected such that the delivery vehicle may operate between said rail systems.

The access point may be connected to the second rail system.

The access point may comprise one single grid cell of the delivery grid system, or the access point may comprise two or more delivery grid cells. The delivery vehicle is operated such that when it is located at the access point, it allows the human and/or robotic operator to access the contents of the storage container.

According to the invention, the delivery vehicle has more than one path to and/or from the access point via the plurality of delivery grid cells. This allows the operator to coordinate the order in which delivery vehicles may enter or exit the access point.

In embodiments, the delivery vehicle may enter the access point at a first end and exits the access point at a second end, such that storage containers can enter the access point continuously one after another.

The access point comprises one or more delivery grid cells for the delivery vehicle at the access point. The delivery grid further provides a plurality of delivery grid cells adjacent the one or more delivery grid cells of the access point, such that there is more than one path to and/or from the access point. For example; each grid cell of the access point may comprise four entrances or exits for the delivery vehicle; two in the X-direction and two in the Y-direction. Since the human or robotic operator needs to stand next to the access point at one side in order to have easy access to the stored items, it may be preferable that the access point comprises three entrances or exits, for example; two in the X-direction and one in the Y-direction. Thus, in this embodiment, the delivery vehicle may enter or exit the access point from above in the Y-direction as well as the two ends in the X-direction. This means that the delivery vehicle has at least three paths to and from the access point, thus, allowing one delivery vehicle to pass another delivery vehicle in the order of arrival at the access station.

The access point may be defined as a predetermined location where the storage container can be accessed and/or handled. The term "handling of storage container" may include stocking or picking items to/from the containers, as well as introducing or removing containers to/from the storage grid. The access point may be any predetermined location which allows storage containers to be accessed from a location outside the storage grid.

The access point may be located in a container accessing station arranged for separating the human operator from the delivery rail system and the delivery vehicles.

The delivery grid may extend to or into the container accessing station. The delivery grid providing one or more delivery grid cells for the remotely operated delivery vehicle at the access point as well as a plurality of delivery grid cells adjacent the delivery grid cells of the access point, such that there is more than one path to and/or from the access point for the remotely operated delivery vehicle via the plurality of delivery grid cells. The remotely operated delivery vehicle is arranged to transport a storage container from the delivery port of the storage grid across the delivery grid to the access point of the container accessing station and return it to the delivery port for storage within the storage grid.

The container accessing station may comprise means for protecting the human operator from components of the delivery system (rails and delivery vehicles) and for allowing easy handling of the storage container and its contents. Said means may be any one of a wall or a cabinet.

The container accessing station may comprise a wall and the access point may be an area corresponding to one or more delivery grid cells of the delivery grid that are arranged on a delivery grid side of the wall in a position where an item in a storage container carried by a remotely operated delivery vehicle can be reached by the robotic or human operator reaching over the wall.

In aspects, the container accessing station may be a cabinet having side walls and a top plate arranged such that it defines an internal volume of the cabinet. The internal volume comprises an open end such that the delivery rail system extends into said internal volume of the cabinet. More specifically, at least one delivery grid cell of the delivery grid system extends into the internal volume of the cabinet.

In an embodiment, the container accessing station comprises a cabinet comprising an opening provided above the access point, and wherein the items held in the storage container are accessible at the access point, through said opening. The opening may be provided in the top plate of the cabinet such that the items held in storage containers are accessible from above.

The delivery vehicle may be operated such that its container carrier and the storage container is in a tilted position while situated at the access point. In the tilted position of the storage container provides increased visibility of the contents of the storage container in addition to easier access to the contents and a better working position for the human operator. The last is directed to reducing strain on back and knees of the human operator.

In embodiments, the delivery rail system provides a delivery grid comprising three or more adjacent rows of delivery grid cells that extend to or into the container accessing station.

For example, the container accessing station may comprise a cabinet covering at least three grid cells; one left grid cell, one mid grid cell and one right grid cell.

Wherein the access point may be located at the mid grid cell and the delivery vehicles may be operated such that they enter into the cabinet at the left grid cell, move to the middle grid cell, where the delivery vehicles is stopped such that its storage containers may be accessed by at least one of a robotic or human operator, and then move further to the right grid cell before it exits the cabinet.

The container accessing station may be provided with an activation device such as a switch, push button or a lever, for re-starting the delivery vehicle after the storage container has been accessed at the mid grid cell position. In operation, the at least one of a robotic or human operator may access the content of a storage container while located at the access point. After the storage container has been accessed, the at least one of a robotic or human operator may push the activation device such that the delivery vehicle moves forward, allowing another delivery vehicle to enter the access point.

In embodiments, the container accessing station may be provided adjoining or detached from a storage grid, where a delivery rail system is arranged between the delivery port of the storage grid and the container accessing station. Storage containers may thus be transported across the delivery rail system between said delivery port and container accessing station.

The remotely operated delivery vehicle is adapted to be moveable on a delivery rail system. Furthermore, the delivery rail system may be a single rail system or a double rail system. The delivery rail system defines grid pattern above which the delivery vehicle can move laterally.

In embodiment, the delivery system may benefit from many of the considerations provided for the rail system and the container handling vehicles of the storage grid To facilitate production and ensure low costs, it is preferable to use already designed and tested components. It is therefore considered advantageous that each grid cell of the delivery rail system has a size which is equal or similar to the size of the grid cells of the rail system for the container handling vehicles.

More specifically, each grid cell of the delivery rail system may have a width which is typically within the interval of 30 to 150 cm, and a length which is typically within the interval of 50 to 200 cm. Each grid opening of the delivery rail system may have a width and a length which is typically 2 to 10 cm less than the width and the length of the grid cell.

The horizontal plane P1 of the delivery rail system is arranged below the horizontal plane P of the rail system of the storage grid.

The container accessing station may be located on a ground floor level such that the storage containers are accessible to human and/or robotic operators without platforms or the like. Accordingly, the delivery rail system may be arranged on vertical support elements such that the horizontal plane (P1) of the delivery rail system may be located at any preferred vertical level above the ground floor level.

In general, the delivery rail system is located at any level below the top level of the storage grid. Preferably, the delivery rail system is located at a level below the delivery port of the storage grid.

The delivery ports may be arranged on a mezzanine level of the storage grid, such that the delivery vehicle may operate on the delivery rail provided below the mezzanine level for delivering or receiving storage containers to/from the delivery port. The mezzanine level is actually the raised base or floor of the storage grid providing a "roof" for the area worked by the delivery vehicles. The mezzanine level is thus adapted to the overall height of the storage container when positioned on the delivery vehicle, and the height of the delivery rail system. This means that the upright members of the storage grid framework have to be finished short in order to be suspended on the mezzanine level. The mezzanine may be supported by upright support posts stepped out from the delivery columns for support of the mezzanine. The height of the upright support posts defines the height of the mezzanine level (the rails of the delivery rail system may themselves be suspended above the floor of the warehouse building).

Further, the extent of the mezzanine in a horizontal plane depends, at least in part, on the total numbers of delivery columns arranged in the storage grid. Thus, the number of delivery columns and the size (extent) of the mezzanine in the X and Y direction may be customized according to the overall size of the storage system and the desired efficiency of the system. Consequently, the adoption of delivery columns means a loss of storage space in the storage grid. However, the benefit is increased delivery efficiency of storage containers in the automated storage and retrieval system, since the congestion of the storage containers at the delivery columns is avoided or at least reduced by means of the delivery system according to the present invention.

The present invention is also related to a delivery system for transport of storage containers between a pick-up/drop-off port of the delivery system and an access point adapted for handling of items held in the storage containers by a robotic operator or human operator.

The delivery system comprises:
- a delivery rail system comprising at least a first set of parallel rails arranged in a horizontal plane (P) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells,
- a remotely operated delivery vehicle comprising a motorized vehicle body and a container carrier provided above the motorized vehicle body for carrying a storage container of the storage containers, and wherein the delivery vehicle is moveable on the delivery grid of the delivery rail system.

Wherein the delivery grid provides one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle via the plurality of delivery grid cells, and wherein the remotely operated delivery vehicle is arranged to transport the storage container from the pick-up/drop-off port of the delivery system across the delivery grid to the access point and return it to the pick-up/drop-off port of the delivery system.

The pick-up/drop-off port of the delivery system constitutes a delivery grid cell, situated below a delivery column of a storage grid and arranged such that the delivery vehicle may receive a storage container from the storage grid, through the delivery column and onto the delivery vehicle, when the delivery vehicle is positioned at the pick-up/drop-off port.

The delivery rail system may comprise at least one transfer zone for temporarily storing storage containers on delivery vehicles, when in transit between the delivery port of the storage grid and the container accessing station. This might be an area that delivery vehicles might queue on route to the access point. The transfer zone may constitute one or more delivery grid cells for the delivery vehicle at the transfer zone. The transfer zone may be located inside or outside the container accessing station.

The invention is also directed to a method of operating a remotely operated delivery vehicle into and out of an access point of a delivery rail system, the access point being a location on the delivery rail system for a robotic or human operator to access an item held in a storage container that has been delivered to the access point.

The delivery system comprises:
- a delivery rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells,
- a remotely operated delivery vehicle comprising a motorized vehicle body and a container carrier provided above the motorized vehicle body and adapted to carry the storage container, and wherein the delivery vehicle is moveable on the delivery grid of the delivery rail system, wherein the delivery grid provides one or more delivery grid cells for the remotely operated delivery vehicle at the access point as well as a plurality of delivery grid cells adjacent the delivery grid cells of the access point, such that there is more than one path to and/or from the access point for the remotely operated delivery vehicle via the plurality of delivery grid cells.

The method comprises the step of:
a) operating the delivery vehicle to direct it to one of the plurality of delivery grid cells adjacent the one or more delivery grid cells of the access point,
b) operating the delivery vehicle to enter the delivery grid cell of the one or more grid cells at the access point from one of the plurality of delivery grid cells adjacent the one or more delivery grid cells of the access point,
c) allowing the robotic or human operator access to the item held in the storage container at the access point,
d) operating the delivery vehicle to exit the one or more delivery grid cells of the access point to one of the plurality of delivery grid cells adjacent the one or more delivery grid cells of the access point.

The access point may be provided in a container accessing station arranged for separating the robotic or human operator from the delivery rail system and the remotely operated delivery vehicle. Thus, the delivery grid extends to or into the container accessing station.

BRIEF DESCRIPTION OF THE DRAWINGS

Following drawings are appended to facilitate the understanding of the invention.

DETAILED DESCRIPTION OF THE INVENTION

Figure 1:
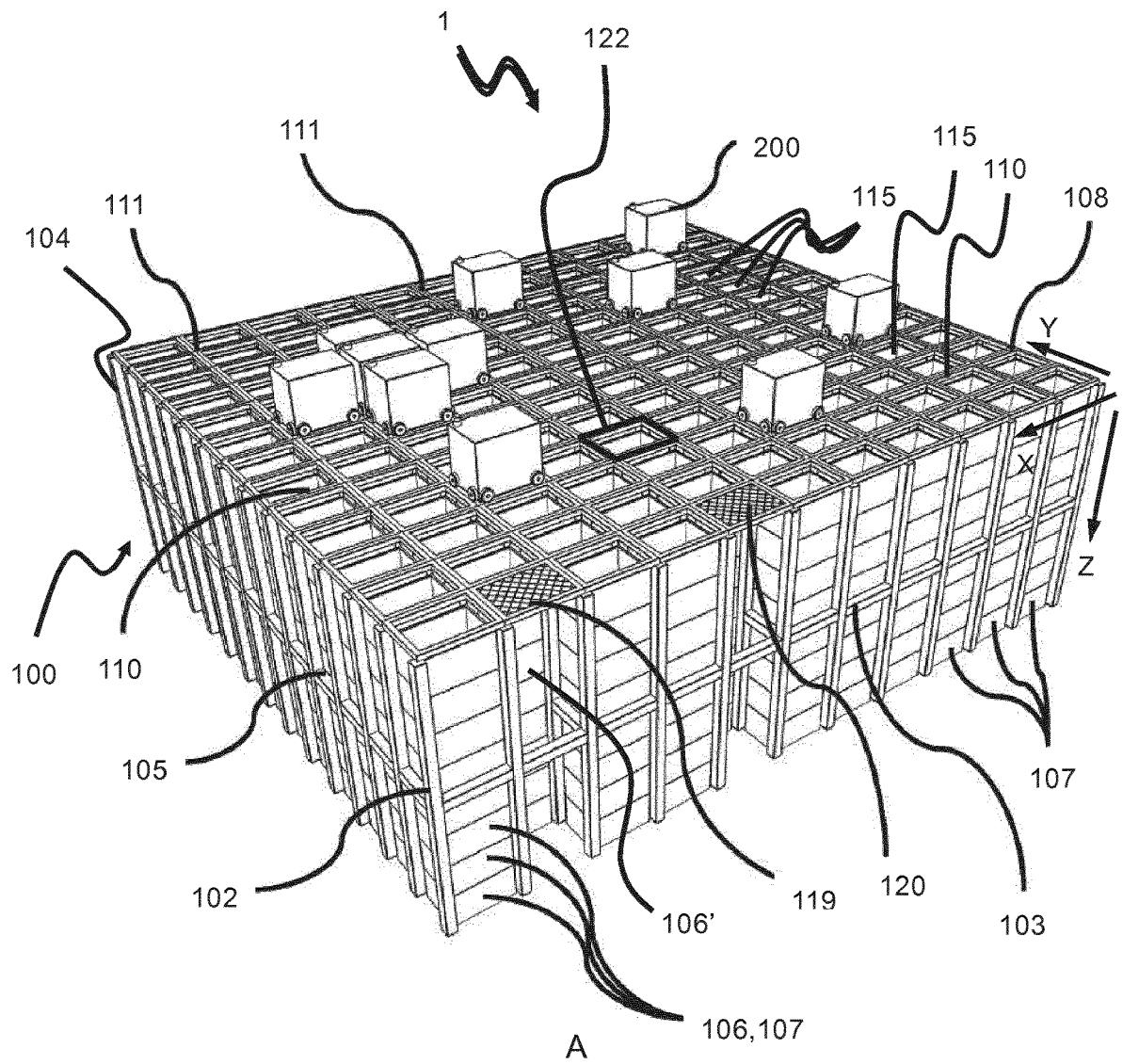
FIGS. 1 A-1 D and 2 A-2 C are perspectives view of a prior art automated storage and retrieval system, where FIGS. 1 A-1 C and FIG. 2A show the complete system and FIGS. 1 B-1 D and FIG. 2 B show examples of system operable prior art container handling vehicles, and where FIG. 2 C shows typical width and length intervals of each grief cell.
Figure 1:
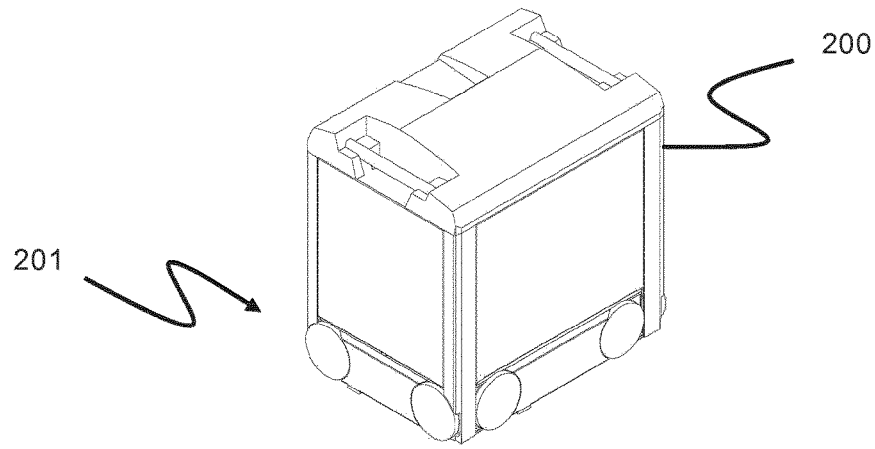
Figure 1:
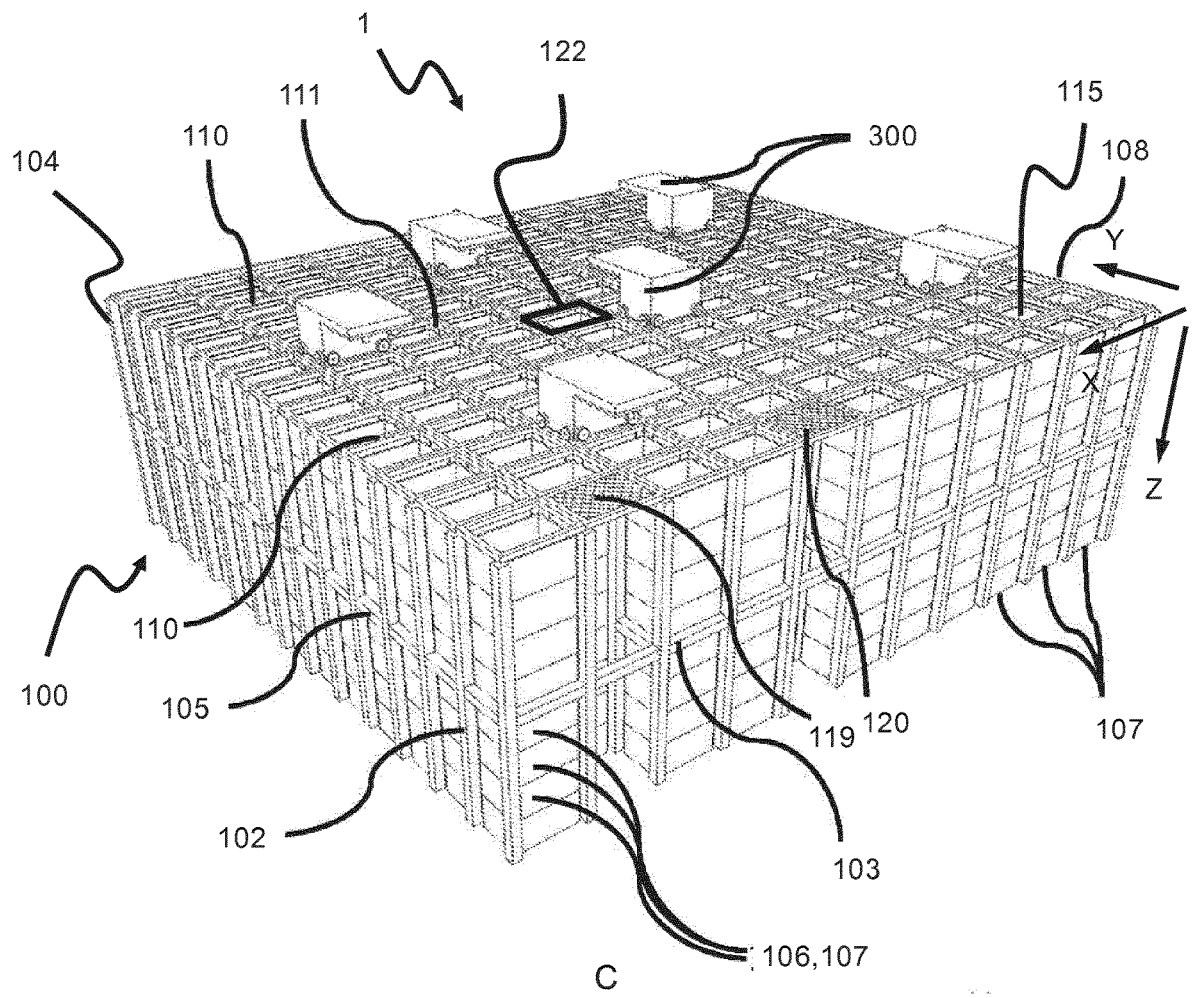
Figure 1:
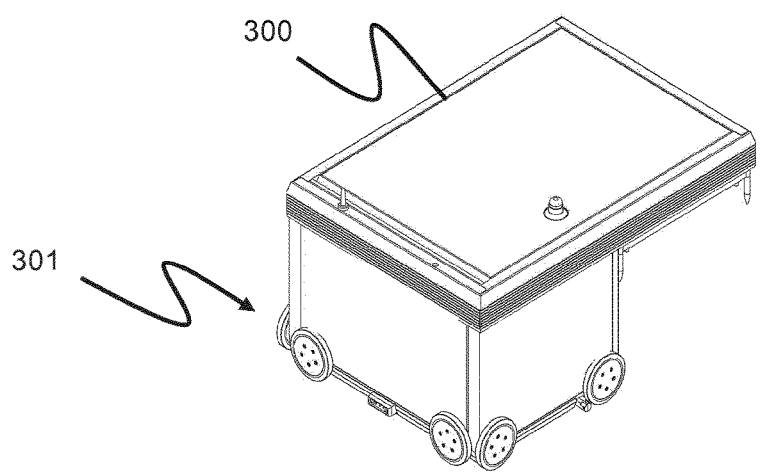

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 3 and 4). In FIGS. 1A and 1C, such a grid cell 122 is marked on the rail system 108 by thick lines.

The rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2:
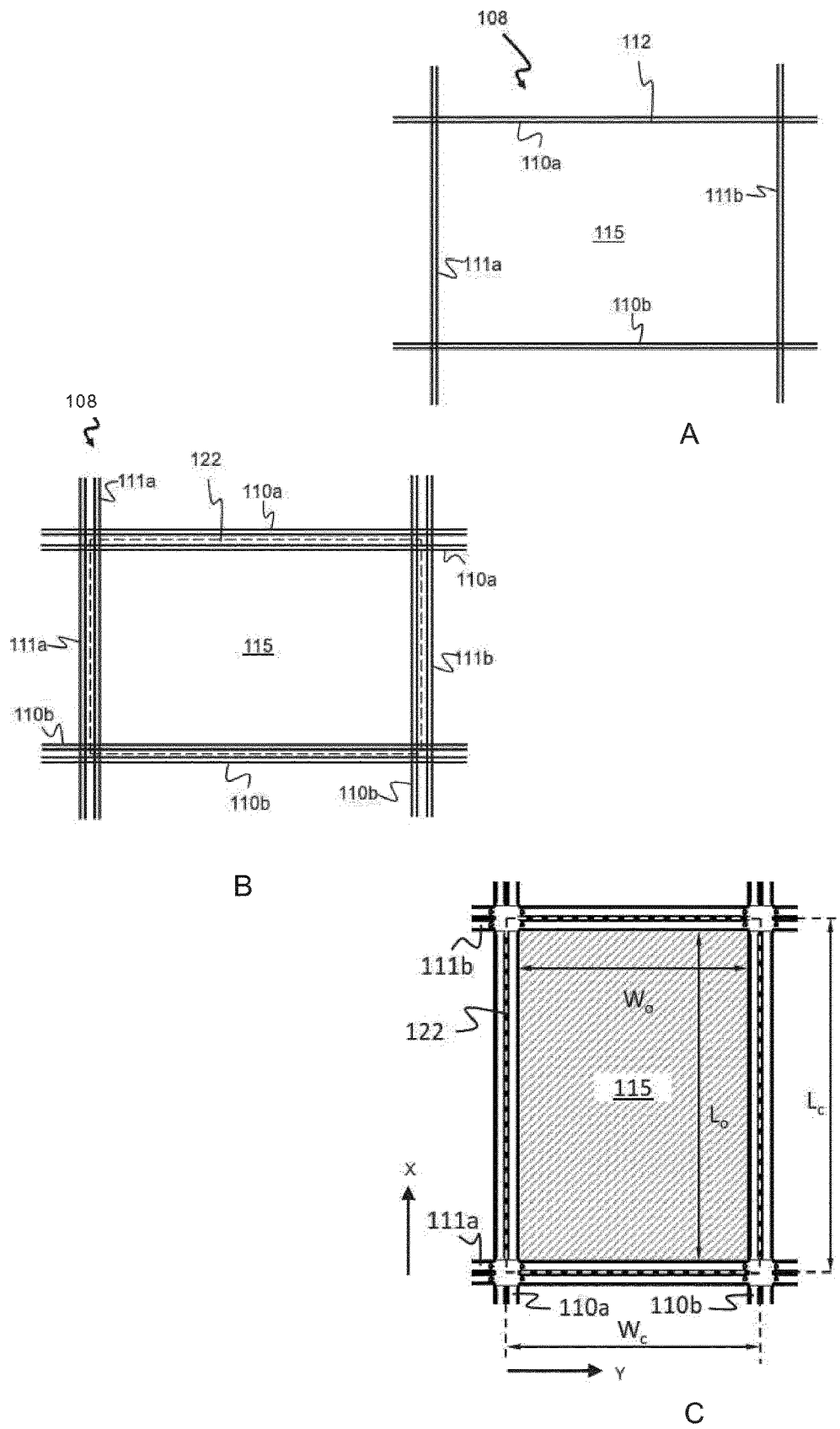

The rail system 108 may be a single rail system, as is shown in FIG. 2A. Alternatively, the rail system 108 may be a double rail system, as is shown in FIG. 2B. Details of the single and double rail system are disclosed this specification under the section of background and prior art.

Figure 3:
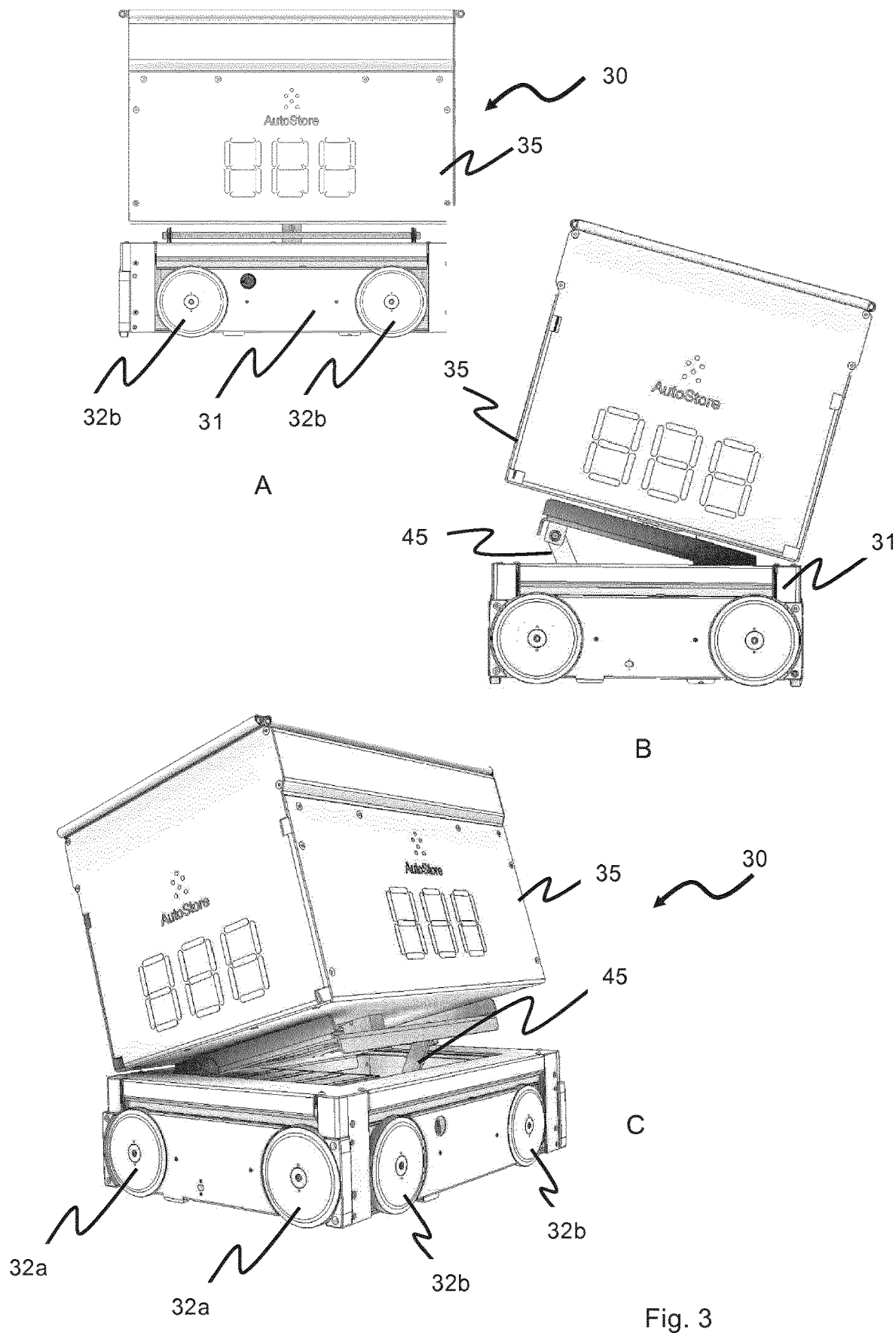
FIG. 3 A-C is a side view of a remotely operated delivery vehicle according to an embodiment of the invention.

FIG. 3 A-C shows an embodiment of a remotely operated delivery vehicle 30 according to the present invention, hereinafter referred to as a delivery vehicle 30.

The delivery vehicle 30 is configured for transport of a storage container 106 (not shown) between an automated storage and retrieval grid 104 (see FIGS. 7 A and B) configured to store a plurality of stacks 107 of storage containers 106, hereinafter referred to as a storage grid 104, and a access point 161 provided in a container accessing station 160 for handling of the storage container 106 by at least one of a robotic operator and human operator.

Said delivery vehicle 30 comprises; a vehicle body 31, a rolling device 32a, 32b connected to the vehicle body 31, a rolling device motor for driving the rolling device 32a, 32b in a horizontal plane (P), and a power source 43 connected to the rolling device motor 33. The power source 43 should provide sufficient power to the rolling device motor (not shown) to propel the rolling device 32a, 32b over a set route from the storage grid 104, for example to an access point 65.

The delivery vehicle 30 may further comprise a container carrier 35 mounted above the vehicle body 31. The container carrier 35 should be configured to receive the storage container 106 onto or within the container carrier 35 such that the storage container 106 is prevented to slide along the horizontal plane (P1).

The container carrier 35 may comprise a container supporting device supporting the storage container 106 from below.

In FIG. 3 A-B the container carrier 35 is disclosed in the form of a storage container receiving compartment having a bottom/base and side walls. The volume of the compartment is in this exemplary configuration such that it may receive and contain the entire horizontal extent of the storage container and at least a part of the vertical extent of the storage container. FIGS. 3 A-C shows examples of container carriers 35 containing an entire storage container 106 and FIG. 4 A-B shows an alternative container carrier 35 containing a part of the storage container 106.

The particular configuration of the container carrier 35 disclosed in 3 A-C allows the delivery vehicle 30 to transport of a storage container 106 having different heights.

Note that the size of the compartment within the container carrier 35 may easily be adapted for receiving and supporting a multiple number of storage containers 106 in one operation.

FIGS. 3 B and 3 C shows a particular configuration of the delivery vehicle 30, where the container carrier 35 may be set in a tilted position relative to the vehicle body 31 and the horizontal plane (P1). The container carrier 35 may be tilted by means of a dedicated displacement device. The tilting may be around a pivot axis directed in the principal moving direction of the delivery vehicle 30. If the delivery vehicle 30 is moving on perpendicular rails (see below), these principal directions would be in either the X direction or the Y direction.

The tilting of the displacement device may for example be obtained by a lifting arm 45 coupled to the vehicle body 31 and the container carrier 35. Further, the lifting arm 45 may be driven by a dedicated tilt motor 42 or the rolling device motor or both.

The displacement device is in FIGS. 3 B and C shown with an L-shaped lifting arm 45 connected at one side to the vehicle body 31 and the opposite side connected to a structure fixed to the container carrier 35. The latter end of the arm 45 may be also be connected directly to the container carrier 35.

The tilt motor 42 is seen arranged fully inside the vehicle body 31 and is connected to the lifting arm 45, directly or indirectly, for moving the lifting arm 45 between a lower position in which the container carrier 35 is not tilted relative to the horizontal plane (P) and an upper position in which the container carrier 35 is tilted relative to the horizontal plane (P). Note that the horizontal plane (P) may be defined as the plane set up by the particular configurations of the wheels 32a,32b of the rolling device 32.

FIGS. 3 A-C and 4 A-C shows perspective views of the delivery vehicle 30. The rolling device 32 comprises in this exemplary configuration:

- a first set of wheels 32a arranged at opposite portions of a vertical centre plane through the vehicle body 31 for moving delivery vehicle 30 along a first direction, for example along an X-direction on a delivery rail system; and
- a second set of wheels 32b arranged at opposite portions of a vertical centre plane through the vehicle body 31 for moving the delivery vehicle 30 along a second direction, for example along a Y-direction on the delivery rail system perpendicular to the first direction X.

Figure 4:
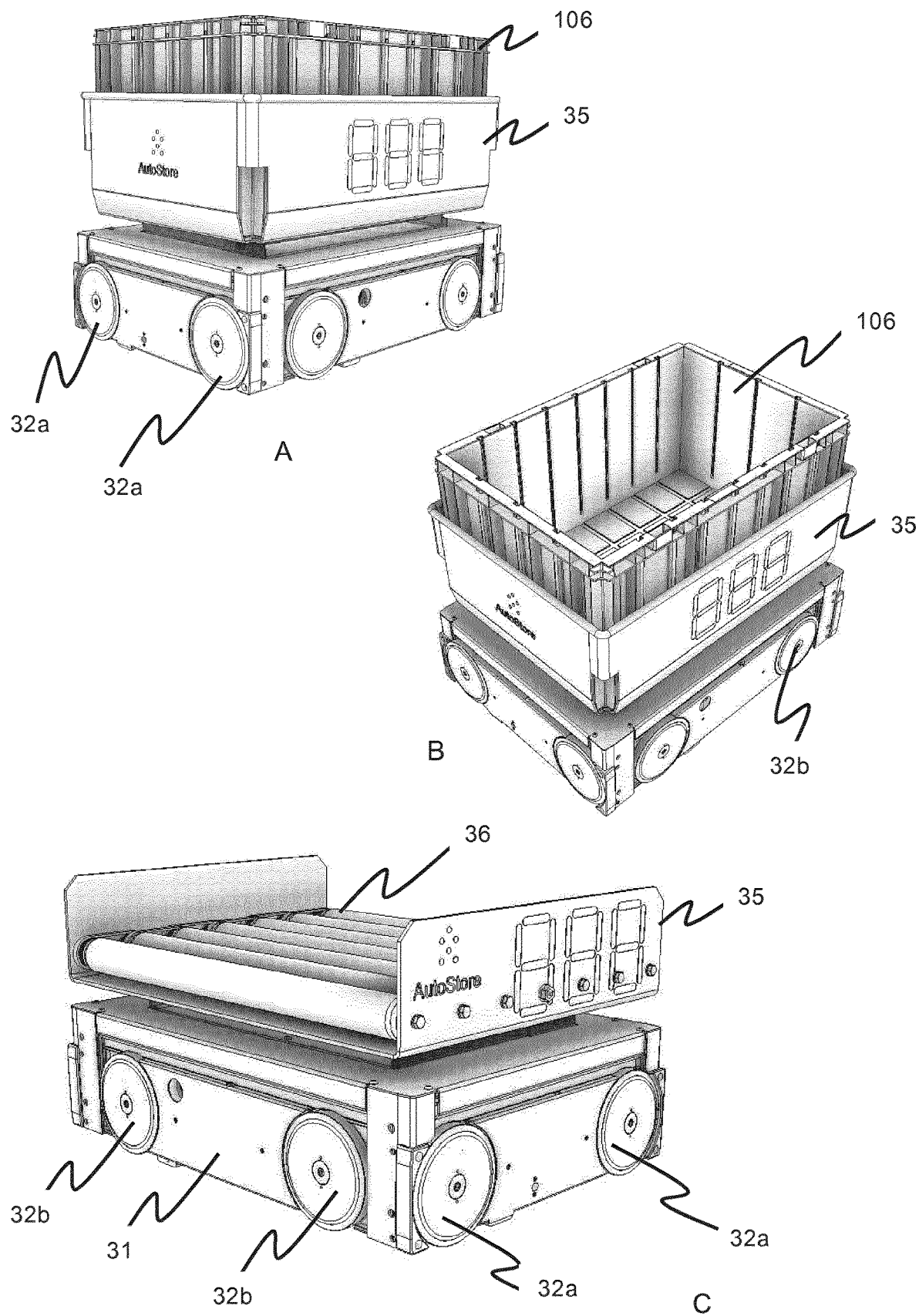
FIGS. 4 A-C is a perspective view of a remotely operated delivery vehicle according to an embodiment of the present invention.

FIG. 4 C shows yet another exemplary configuration of the remotely operated delivery vehicle 30. In this configuration the container carrier 35 comprises a base plate, a conveyor arranged on the base plate and two side walls protruding upwards from the base plate. The rolling device 32 and the vehicle body 31 are equal or similar to the rolling device 32 and the vehicle body 31 described above in connection with FIGS. 3-5.

The conveyor may be set up by inter alia a plurality of parallel oriented rolls 36 having a common longitudinal direction perpendicular to the two side walls. In this way the rolls 36 allow one or more storage containers 106 to be shifted into or off the container carrier 35 while being guided by the side walls. The conveyor may be connected to a conveyor motor allowing rotation of one or more of the rolls.

Figure 5:
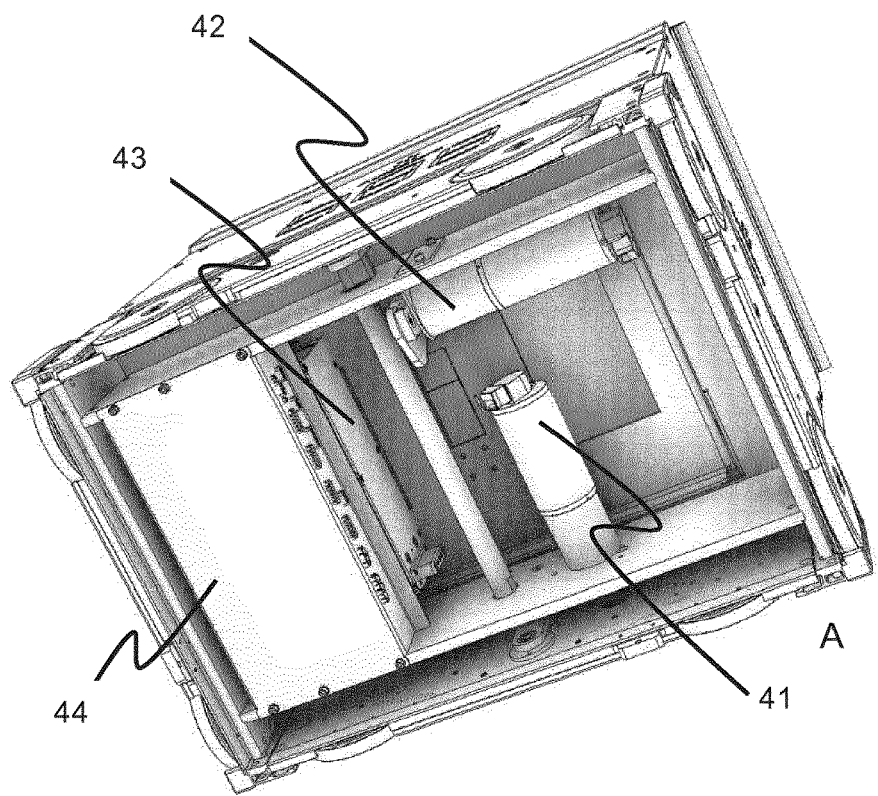
FIG. 5 A-B is a perspective view of a remotely operated delivery vehicle of FIG. 4 A, from the underside.
Figure 5:
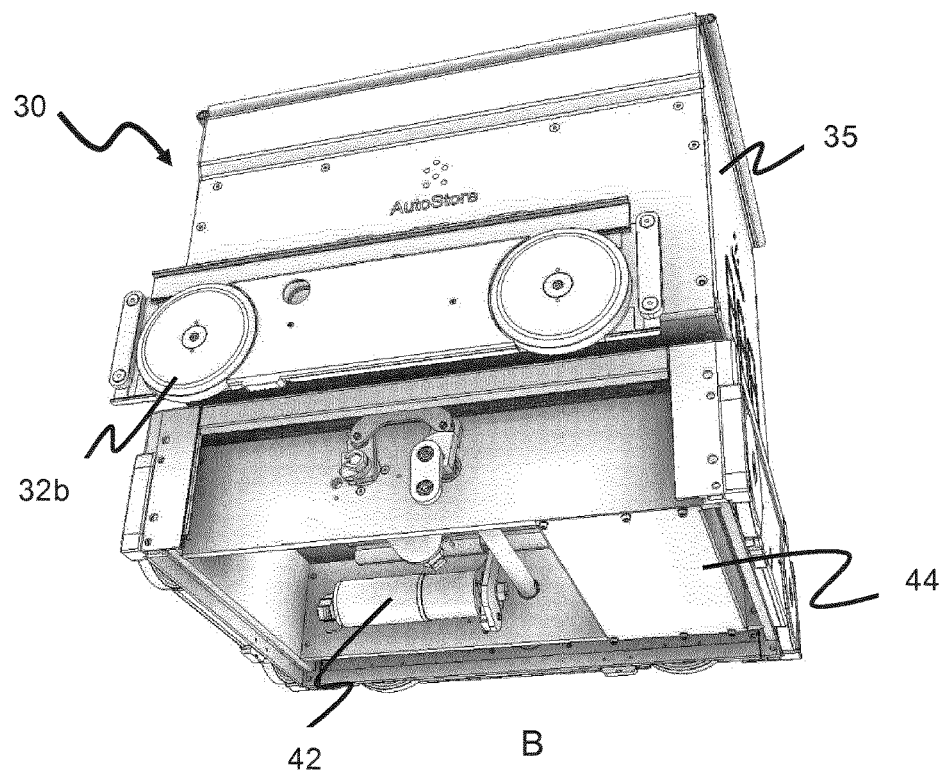

FIGS. 5 A and B shows the delivery vehicle 30 from below. As clearly seen in FIG. 5 A the vehicle body 31 of the delivery vehicle 30 comprises an internal component receiving recess or compartment for containing components such as one or more dedicated tilt motors 42, one or more track shift motors 41, one or more power storage sources such as a battery 43 and one or more control cards such as CPU and/or Power PCB 44. The above-mentioned components are thus located within the vehicle body 31, below the container carrier 35.

The storage container receiving compartment of the container carrier 35 has in this particular configuration a rectangular bottom plate or base plate with vertical side walls. The vertical side walls can be of any height as long as they ensure that the storage container 106 is restricted to move along the base plate of the container carrier.

For example, the size of the compartment 35 may correspond to the size of a storage container 106, thereby fully containing the storage container 106.

In case of a container carrier 35 being configured to support a multiple number of storage containers 106, the size of the vertical walls may in one example be the height of each storage container 106 and the size of the base plate may be the sum of the cross-sectional area of all storage containers 106 measured relative to their outer lateral extremities.

FIG. 5 B shows the delivery vehicle 30 as described above with the vehicle body 31 and the rolling device 32 of eight wheels 32a,32b. As for the delivery vehicle shown in FIGS. 3-5, the first set of four wheels 32a enable lateral or horizontal movement of the delivery vehicle 30 in a first direction and the second set of the remaining four wheels 32b enable the lateral or horizontal movement in the second direction which may be perpendicular to the first direction.

If used on a delivery rail system 50 one or both sets of wheels 32a,32b of the rolling device 32 should be lifted and lowered so that the first set of wheels 32a and/or the second set of wheels 32b can be engaged with the respective set of rails provided on the delivery rail system 50 any one time.

Perspective views of an automated storage and retrieval system is shown in FIG. 6-9. The system comprises a storage grid 104 and a delivery system 140 comprising a delivery rail system 50, a plurality of delivery vehicles 30 and an access point 65 provided in a container accessing station 60.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 300.

The rail system 108 comprises a first set of parallel tracks 110 arranged in a horizontal plane (P) and extending in a first direction (X) and a second set of parallel tracks 111 arranged in the horizontal plane (P) and extending in a second direction (Y) which is orthogonal to the first direction (X). The first and second sets of tracks 110, 111 form a grid pattern in the horizontal plane (P) comprising a plurality of adjacent grid cells 122. Each grid cell 122 displays a grid opening defined by a pair of neighboring rails of the first set of rails 110 and a pair of neighboring rails of the second set of rails 111

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

The delivery system 140 comprises one or more of the delivery vehicles 30 as described above, i.e. delivery vehicles 30 configured to receive and support storage container 106 for transport between one or more delivery columns 119,120 and one or more container handling stations 160 located outside the storage grid 104. The container handling station 160 may be located any predetermined position suitable for handling containers.

The delivery system 140 may further comprise a delivery rail system 50 situated below a delivery port 150 of the one or more delivery columns 119,120.

Figure 6:
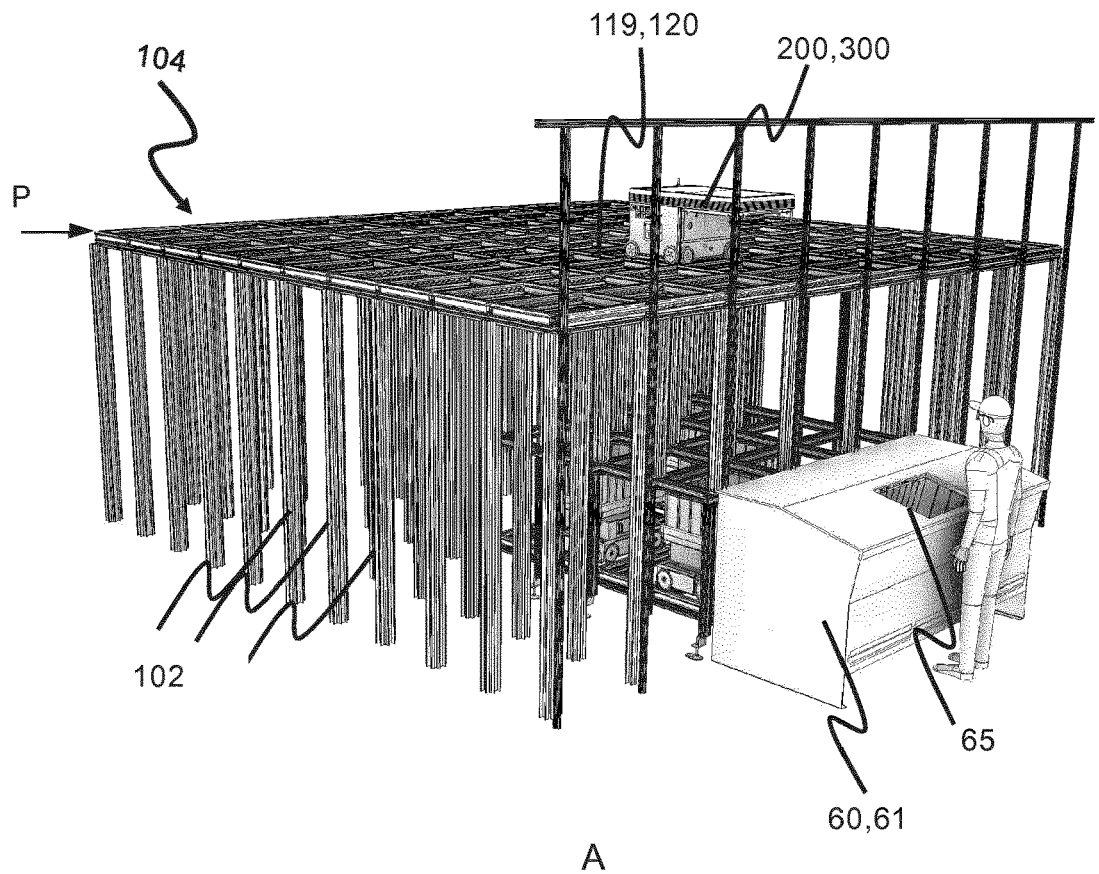
FIG. 6 A-B is a perspective view of another automated storage and retrieval grid and a delivery system according to an embodiment of this the present invention.
Figure 6:
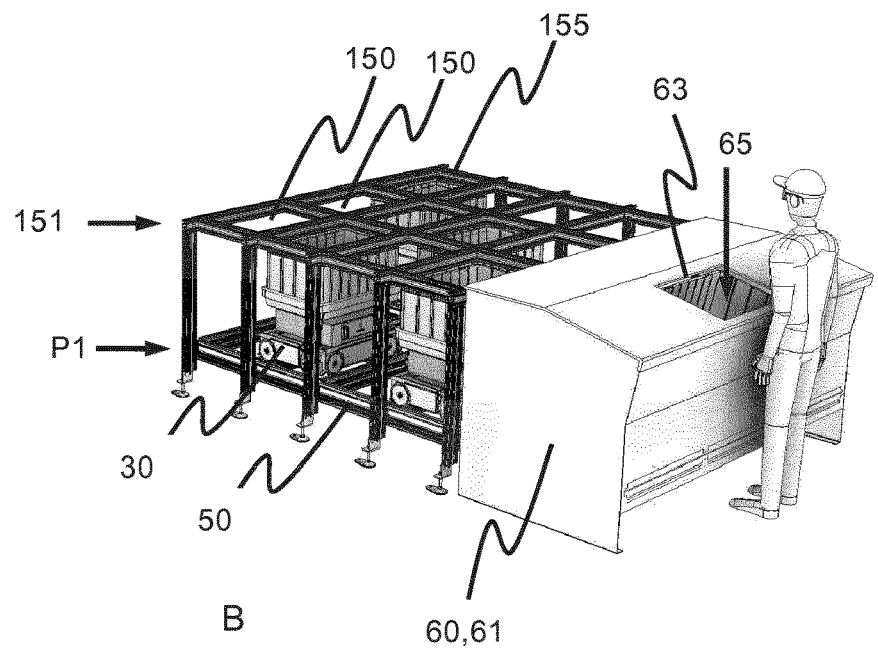

As shown in FIG. 6 A-B, the delivery rail system 50 may be constructed in the same way or a similar way as the rail system 108 for the container handling vehicles 200,300. The delivery rail 50 extends at least from the delivery port 150 of one or more delivery columns 119,120, and into the at least one container accessing station 60 and further to the access point 65, such that each delivery vehicle 30 can move into the at least one container accessing station 60 and towards the access point 65 of the container accessing station 60 where items held in the storage container 106 may be accessed.

The container accessing station may comprise a cabinet 60 comprising walls and a top cover supported thereon. The items held in the storage containers 106 carried by the delivery vehicle 30 at the access point 65 is reachable trough an opening 63 in the top cover.

The cabinet 60 is arranged adjoining the storage grid 104, where the delivery rail system 50 extends from below the delivery ports 150 and to or into an internal volume of the cabinet 60.

The delivery rail system may be a single rail system or a double rail system, or a combination of the two.

The delivery rail system 50 may comprise at least a first set of parallel rails arranged in a horizontal plane (P1) and extending in a first direction (X), and at least a second set of parallel tracks arranged in the horizontal plane (P) and extending in a second direction (Y) which is orthogonal to the first direction (X), the first and second sets of rails together defining a delivery grid 51 of delivery grid cells 52.

The delivery rail system 50 may be fully or partly integrated into the storage grid 104. FIGS. 6 A and 6 B shows the delivery rail system 50 partly integrated into the storage grid, where the part of the delivery rail system 50 located outside the storage grid are covered by the cabinet 61. The cabinet 61 may be provided with six grid cells located in the internal volume the cabinet 61. The delivery grid 51 provides one or more delivery grid cells 52 for the remotely operated delivery vehicle 30 at the access point 65 as well as a plurality of delivery grid cells 52 adjacent the one or more delivery grid cells 52 of the access point 65, such that there is more than one path to and/or from the access point 65 for the remotely operated delivery vehicle 30 via the plurality of delivery grid cells 52.

The access point 65 is related to a dedicated location in the container accessing station 60 where product items are removed from, or positioned into, the storage containers 106.

The cabinet may comprise walls and a top cover supported thereon. The items held in the storage containers 106 carried by the delivery vehicle 30 at the access point 65 may be is reachable through an opening 63 in the top cover.

The delivery rail system 50 extends between a location vertically below the delivery port 150 to or into the container accessing station 60, and the remotely operated delivery vehicle 30 is arranged for transport of storage containers between the delivery port 150 and the access point 65 of the container handling station 60.

FIG. 6 B show the delivery system of FIG. 6 A without the storage grid 104.

The container accessing station 60 may be located on a ground floor level as shown in FIGS. 6 A and 6B, such that the storage containers 106 are accessible to human and/or robotic operators at the access point 65.

The delivery ports 150 may be arranged on a mezzanine level 151 of the storage grid 104, such that the delivery vehicle may operate on the delivery rail 50 provided below the mezzanine level 151 for delivering or receiving storage containers 106 to/from the delivery port 150. The mezzanine 155 is thus adapted to the overall height of the storage container 106 when positioned on the delivery vehicle 30, and the delivery rail system 50.

Further, the extent of the mezzanine 155 in a horizontal plane, depends on the total numbers of delivery columns arranged in the storage grid. Thus, the number of delivery columns 119, 120 and the extent of the mezzanine 155 in the X and Y direction may be customized according to the size of the storage system and the desired efficiency of the system.

The container accessing station 160 may further be defined as any means for protecting the human operator from components of the delivery system (rails and delivery vehicles) and for allowing easy handling of the storage container 106 and its contents. In other words, it provides a barrier between the human operator components of the delivery system.

It may be considered advantageous for ensuring an effective operation that the delivery rail system 50 has a horizontal extent that cover a delivery port 150 below at least one of the delivery columns 119,120 and extends to the outside of the storage grid 104. This inventive configuration shown in FIGS. 7 A and 7 B allows a plurality of delivery vehicles 30 to operate on the delivery rail system 50, while avoiding congestion of storage containers around the delivery column 150.

Figure 7:
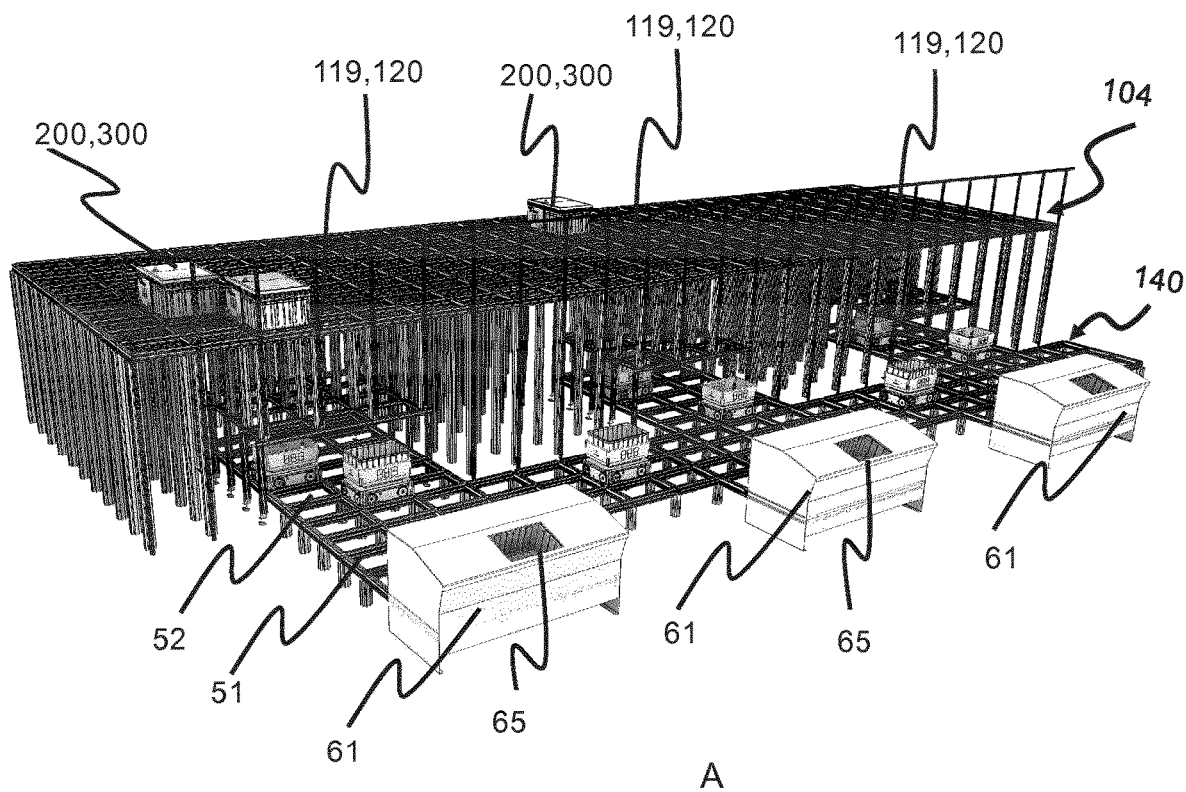
FIG. 7. A-B is a perspective view of a set of exemplary container accessing stations.
Figure 7:
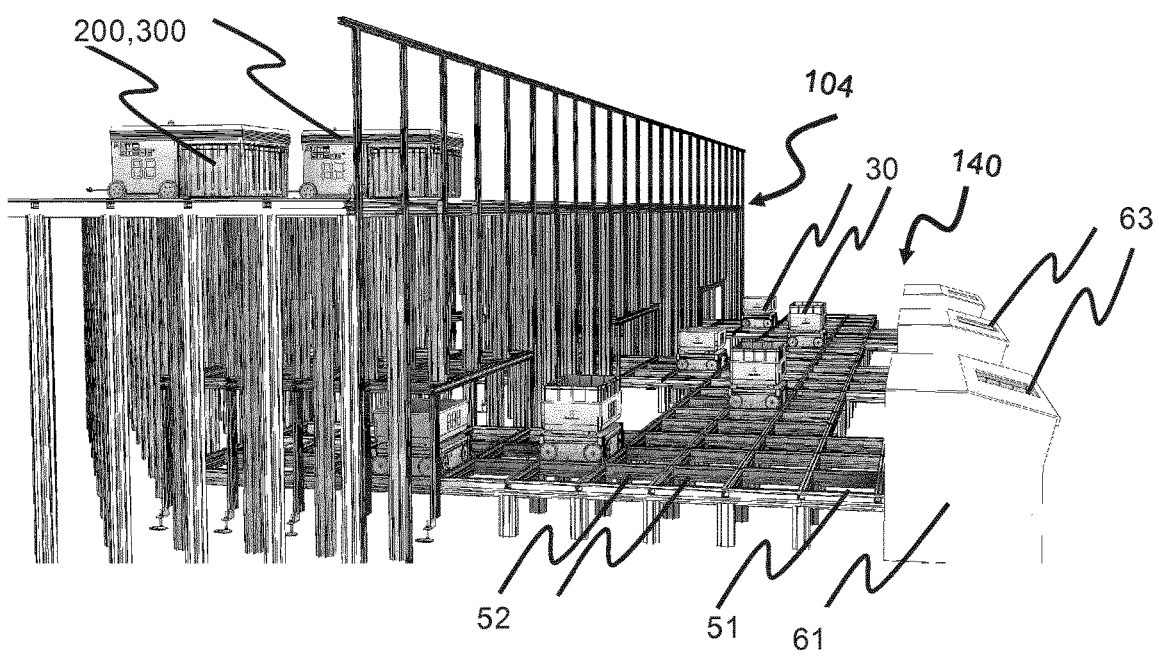
Figure 8:
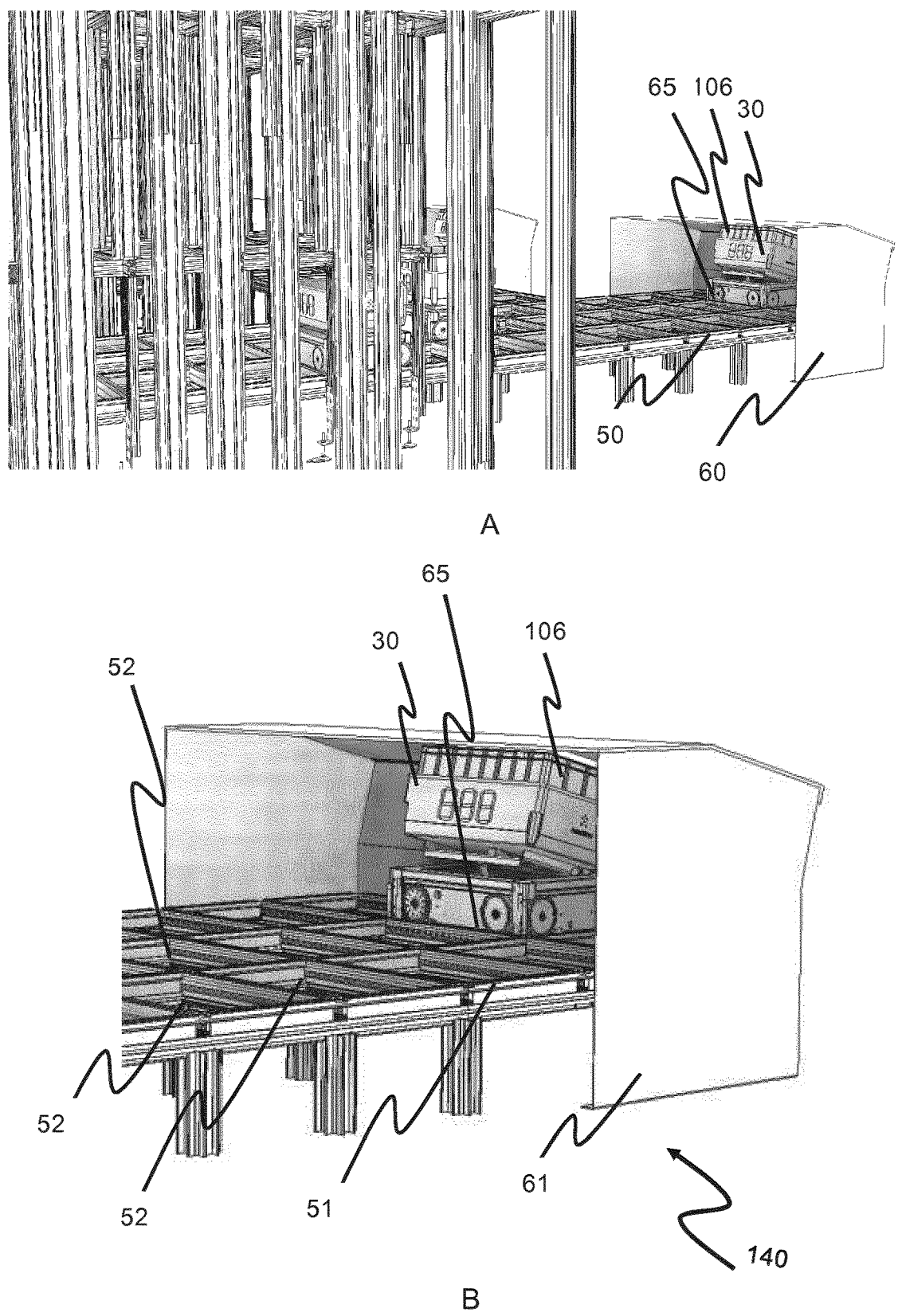
FIG. 8 A-B is a perspective view of another exemplary automated storage and retrieval grid and delivery system comprising a container accessing station.

FIGS. 7 and 8 shows three container accessing stations 60, each comprising a cabinet 60 comprising walls and a top cover supported thereon, wherein the items held in the storage container 106 carried by a remotely operated delivery vehicle 30 at the access point 65 is reachable through the opening 63 in the top cover.

The opening 63 in the top cover is located directly over the delivery grid cell 52 defining the access point 65.

The access point 65 may comprise one single grid cell of the delivery grid 50, or the access point 65 may comprise two or more delivery grid cells 52. The delivery vehicle 30 is operated such that when it is located at the access point 65, it allows the human and/or robotic operator to access the contents of the storage container 106.

As shown in FIG. 8 A-B, the delivery vehicle 30 has more than one path to and/or from the access point 65 via the plurality of delivery grid cells 52. This allows the operator to coordinate the order in which delivery vehicles 30 may enter or exit the access point 65.

The delivery vehicle 30 in FIGS. 8 A and B, may enter the access point 65 at a first end and exits the access point 65 at a second end, such that storage containers 106 may enter and exit the access point 65 continuously one after another.

To increase the visibility, easy access and a better working position for the human operator accessing the storage container 106 at the access point 65, the delivery vehicle 30 may be operated with the container in a tilted position towards the 30 human operator. FIGS. 8 A and B shows the container of the delivery vehicle 30 in the tilted position at the access point 65.

Figure 9:
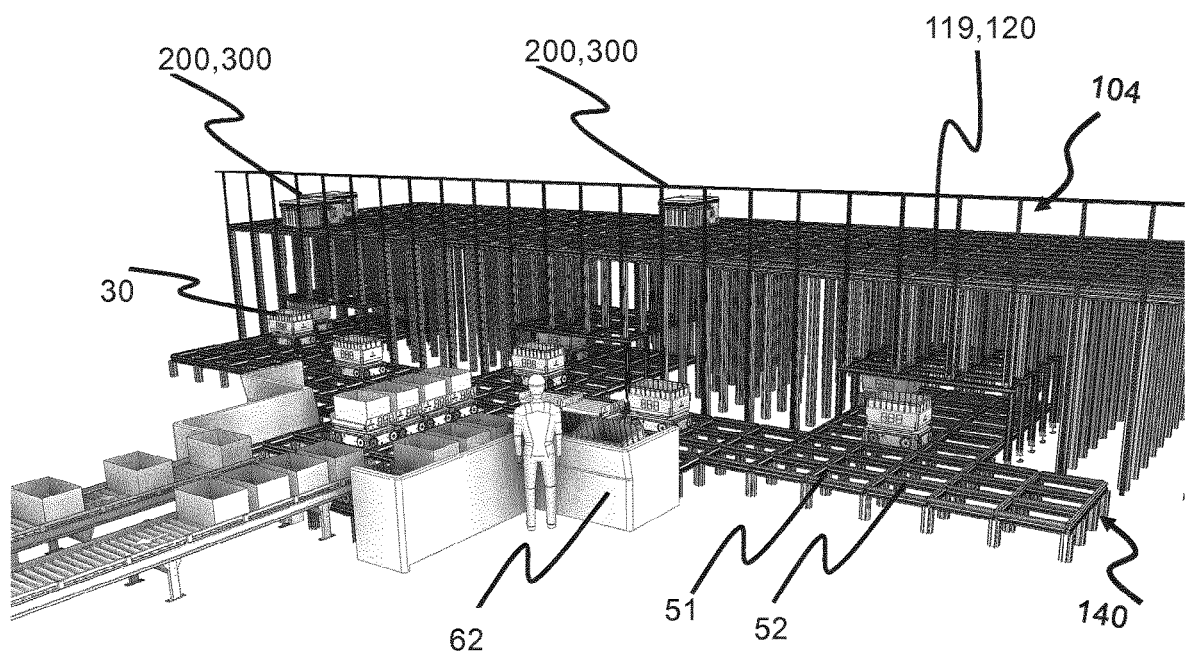
FIG. 9 A-B is a perspective view of another exemplary automated storage and retrieval grid and delivery system comprising a container accessing station.
Figure 9:
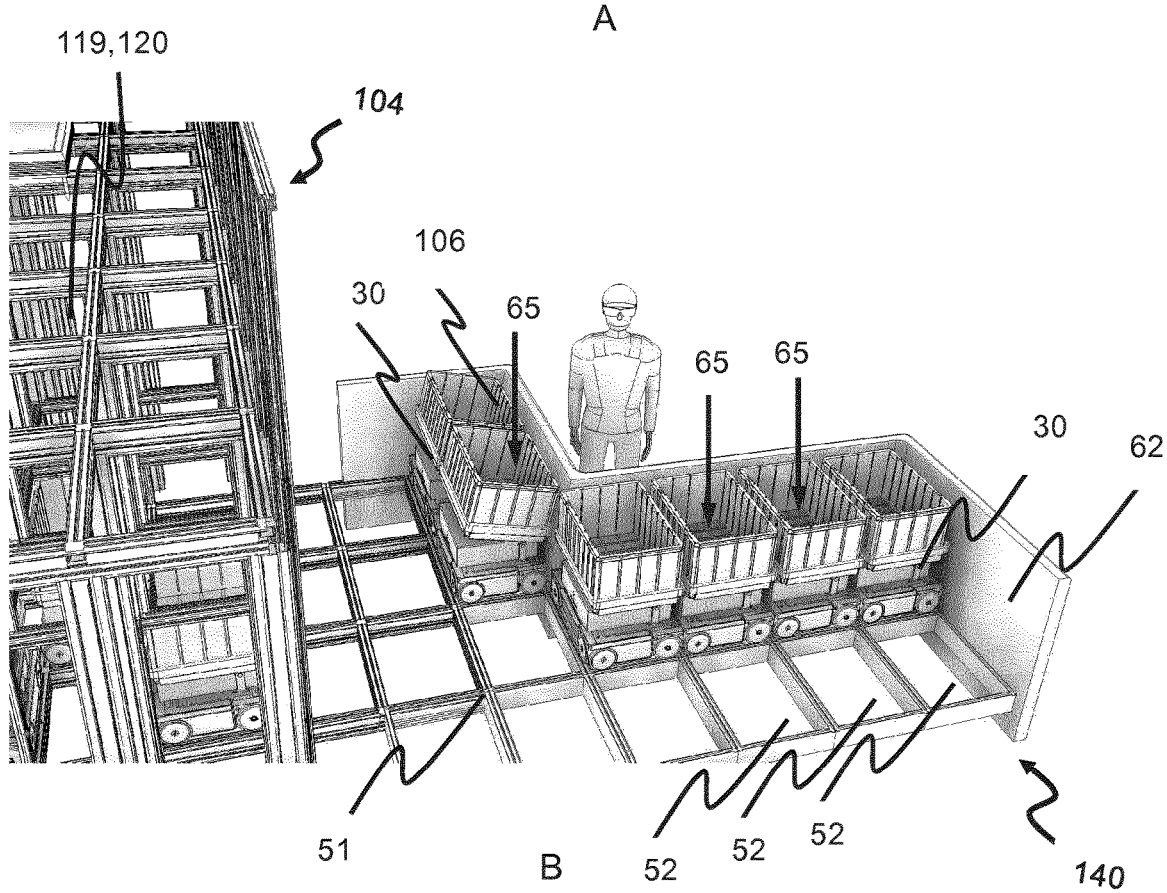

FIG. 9 A shows a perspective view of the automated storage and retrieval system in combination with a secondary delivery system comprising conveyors. The 35 conveyers are arranged for transport of goods between the automated storage and retrieval system and another storage facility, production facility, etc. The goods may be handled at the container accessing station 60 for further transport to the storage grid 104 in storage containers 106, or they can be collected from the storage containers 106 for transport to other facilities onto the conveyors.

The container accessing station 60 in FIGS. 9 A and B comprises walls 62 for separating the delivery grid 51 and delivery vehicle 30 from the human operator.

The access point 65 is an area corresponding to one or more delivery grid cells 52 of the delivery grid 51 that are arranged on a delivery grid 51 side of the wall 62 in a position where the items held in the storage container 106 carried by a remotely operated delivery vehicle 30 can be reached by the robotic or human operator leaning over the wall 62.

In FIGS. 9 A and B the access point may comprise a plurality of separate delivery grid cells 52, thus allowing the human operator to access six different storage containers at the access point.

The delivery vehicles 30 may be operated such that they are tilting the container carrier 35 and the storage container 106 at a preferred location at the access station 65.

Figure 10:
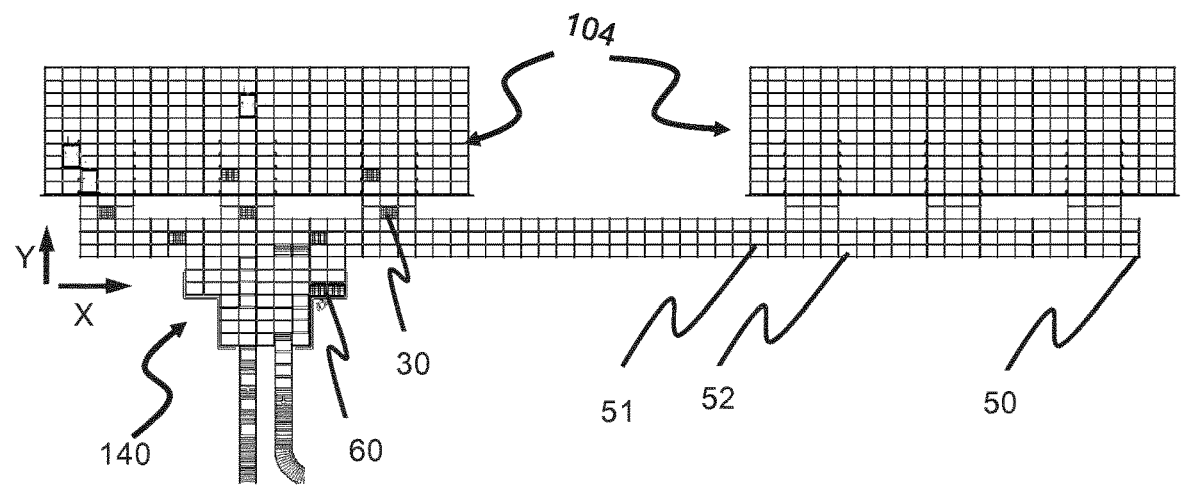
FIG. 10 is a top view of another exemplary automated storage and retrieval grid and a delivery system according to the present invention.

FIG. 10 shows a top view of the embodiment of FIG. 9 A and in a larger scale. The storage system comprises two storage grids 104 and the delivery rail system 50 of the delivery system 140 is arranged such that it connects the two separated storage grids 104. In this way, storage containers 106 can be transported between the two separated storage grids 104 and between the two storage grids 104 and the container accessing station 60.

REFERENCE NUMERALS

30 Delivery vehicle
31 Vehicle body
32 Rolling device
32a First set of wheels
32b Second set of wheels
35 Container carrier
36 Rolls of conveyor
41 Displacement device
42 Tilt motor
43 Power source
44 Controller
45 Lifting arm
50 Delivery rail system
51 Delivery grid
52 Delivery grid cell
60 Container accessing station
61 Cabinet
62 Wall
63 Opening top cover of cabinet
65 Access point
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
151 Mezzanine level
155 Mezzanine 200 First container handling vehicle
201 Wheel arrangement
300 Second container handling vehicle
301 Wheel arrangement
X First direction
Y Second direction
P Horizontal plane of rail system

The invention claimed is:

1. An automated storage and retrieval system comprising:
a storage grid for storing a plurality of storage containers; and
a delivery system for transporting said plurality of storage containers between a delivery port of the storage grid and an access point of the delivery system, the access point being adapted for handling items held in the storage containers by a robotic operator or human operator;
wherein the delivery system comprises: a delivery rail system comprising at least a first set of parallel rails arranged in a horizontal plane (P1) and extending in a first direction (X) and at least a second set of parallel rails arranged in the horizontal plane (P1) and extending in a second direction (Y) which is orthogonal to the first direction (X), the first and second sets of parallel rails together defining a delivery grid of delivery grid cells; the access point; and a remotely operated delivery vehicle comprising a motorized vehicle body and a container carrier provided above the motorized vehicle body for carrying a storage container of the plurality of storage containers;
wherein the remotely operated delivery vehicle is moveable on the delivery grid of the delivery rail system;
wherein the delivery grid provides one or more delivery grid cells for the remotely operated delivery vehicle at the access point as well as a plurality of delivery grid cells adjacent the one or more delivery grid cells of the access point, such that there is more than one path to and from the access point for the remotely operated delivery vehicle via the plurality of delivery grid cells;
wherein the remotely operated delivery vehicle is arranged to transport the storage container from the delivery port of the storage grid across the delivery grid to the access point and return the storage container to the delivery port for storage within the storage grid;
wherein the access point is provided in a container accessing station, said station being arranged for separating the robotic operator or human operator from the delivery rail system and the remotely operated delivery vehicle; and
wherein the container accessing station comprises a cabinet comprising a plurality of walls and a top cover supported thereon, wherein the items held in the storage container carried by the remotely operated delivery vehicle at the access point is reachable through an opening in the top cover.

2. The automated storage and retrieval system according to claim 1, wherein the delivery grid extends to or into the container accessing station.

3. The automated storage and retrieval system according to claim 1, wherein the delivery rail system provides a delivery grid comprising three or more adjacent rows of delivery grid cells extending to or into the container accessing station.

4. The automated storage and retrieval system according to claim 1, wherein the delivery rail system ROOM comprises at least one transfer zone for temporarily storing storage containers on delivery vehicles, when in transit between the delivery port of the storage grid and the container accessing station.

5. The automated storage and retrieval system according to claim 1, wherein the delivery vehicle comprises:
a first set of wheels, arranged at opposite portions of the motorized vehicle body, for moving the remotely operated delivery vehicle along a first direction (X) on the delivery rail system; and
a second set of wheels, arranged at opposite portions of the motorized vehicle body, for moving the remotely operated delivery vehicle along a second direction (Y) on the delivery rail system, the second direction (Y) being perpendicular to the first direction (X), and
a power source configured to provide propulsion power, wherein the remotely operated delivery vehicle is arranged for self-propelled operation on the delivery rail system to the container accessing station.

6. The automated storage and retrieval system according to claim 1, wherein the container carrier of the remotely operated delivery vehicle can be maneuvered into a tilted position relative to the vehicle body at the container accessing station.

7. A method of operating a remotely operated delivery vehicle into and out of an access point of a delivery rail system, the access point being a location on the delivery rail system for a robotic or human operator to access an item held in a storage container that has been delivered to the access point,
wherein the delivery system comprises:
a delivery rail system comprising at least a first set of parallel rails arranged in a horizontal plane (P1) and extending in a first direction (X), and at feast a second set of parallel rails arranged in the horizontal plane (P1) and extending in a second direction (Y) which is orthogonal to the first direction (X), the first and second sets of rails together defining a delivery grid of delivery grid cells,
the access point,
a remotely operated delivery vehicle comprising a motorized vehicle body and a container carrier provided above the motorized vehicle body and adapted to carry the storage container, and wherein the delivery vehicle is moveable on the delivery grid of the delivery rail system,
wherein the delivery grid provides one or more delivery grid cells for the remotely operated delivery vehicle at the access point as well as a plurality of delivery grid cells adjacent the delivery grid cells of the access point, such that there is more than one path to and/or from the access point for the remotely operated delivery vehicle via the plurality of delivery grid cells,
wherein the access point is provided in a container accessing station said station being arranged for separating the robotic or human operator from the delivery rail system and the remotely operated delivery vehicle,
wherein the container accessing station comprises a cabinet comprising walls and a top cover supported thereon, wherein the items held in the storage container carried by a remotely operated delivery vehicle at the access point is reachable through an opening in the top cover, and
wherein the method comprises:
a) operating the delivery vehicle to direct the delivery vehicle to one of the plurality of delivery grid cells adjacent the one or more delivery grid cells of the access point, b) operating the delivery vehicle to enter the delivery grid cell of the one or more grid cells at the access point from one of the plurality of delivery grid cells adjacent the one or more delivery grid cells of the access point,
c) allowing the robotic or human operator access to the item held in the storage container at the access point,
d) operating the delivery vehicle to exit the one or more delivery grid cells of the access point to one of the plurality of delivery grid cells adjacent the one or more delivery grid cells of the access point.

8. The method according to claim 7, wherein the delivery grid extends to or into the container accessing station.

* * * * *